United States Patent [19]
Cherrick et al.

[11] Patent Number: 5,537,612
[45] Date of Patent: Jul. 16, 1996

[54] REMOTELY SELECTABLE AUDIO/VIDEO/TEXT DISRUPTION

[75] Inventors: Sol M. Cherrick, Chicago; Kevin J. Gaughan, Arlington Heights, both of Ill.

[73] Assignee: Zenith Electronics Corporation, Glenview, Ill.

[21] Appl. No.: 239,646

[22] Filed: May 9, 1994

[51] Int. Cl.⁶ .................................................. H04N 7/16
[52] U.S. Cl. ...................... 380/7; 380/6; 348/5.5
[58] Field of Search .................. 348/5.5; 380/6, 380/7, 9, 10, 54

[56] References Cited

U.S. PATENT DOCUMENTS

| | | | |
|---|---|---|---|
| Re. 29,997 | 5/1979 | Den Toonder | 380/7 X |
| 4,085,422 | 4/1978 | Niwata et al. | 380/7 |
| 4,317,213 | 2/1982 | Di Lorenzo | 380/7 |
| 4,367,557 | 1/1983 | Stern et al. | 380/7 X |
| 4,461,032 | 7/1984 | Skerlos | 380/10 |
| 4,550,341 | 10/1985 | Naito | 348/5.5 |
| 4,626,892 | 12/1986 | Nortrup et al. | 348/569 |
| 4,792,972 | 12/1988 | Cook, Jr. | 380/10 X |
| 4,837,623 | 6/1989 | Motoyama | 348/633 |
| 4,908,859 | 3/1990 | Bennett et al. | 380/10 |
| 4,926,264 | 5/1990 | Ohno et al. | 348/5.5 |

*Primary Examiner*—Bernarr E. Gregory
*Attorney, Agent, or Firm*—Roland W. Norris; Ralph Clarke, Jr.

[57] ABSTRACT

A television receiver is equipped with hardware/firmware so that it may be disabled by a remotely transmitted series of codes. In a preferred embodiment, the display of the receiver indicates that the receiver is operable, but has been disrupted, rather than being broken. The invention is particularly useful for commercial situations such as rentals or lodging facilities where payment is expected for use of the television.

18 Claims, 2 Drawing Sheets

REMOTELY SELECTABLE AUDIO/VIDEO/TEXT DISRUPTION

BACKGROUND OF THE INVENTION

1. Field of the Invention

This invention relates to television receivers and their control, and is addressed specifically to a means for disrupting the normal operation of a television receiver by means of a remote control hand-set.

2. Discussion of Related Art

At times it may be necessary for the owner of an audio-visual display device, such as a television receiver, to deny the use thereof to an end user having effective possession of the device. Common situations in this category would be commercial owners such as rent-to-own stores or lodging facilities who have not received payment for the use of the device.

Thus, there has arisen a desiderata among such owners for a way to temporarily disrupt or disable the normal operation of the television in order to encourage an agreed upon payment for its use and/or to deny access to the television where no payment has been made.

The means for disruption should make it possible for the owner to disable the television receiver over a "line of sight" path, and without the need for hands-on access to the receiver. Also, the owner should have the ability to deny the use of several receivers with a single remote control hand-set. It is further desirable that the end user realize that the television operation has been disrupted and that the device itself is not broken.

OBJECTS OF THE INVENTION

A) It is an object of the invention to provide means for disrupting operation of a television receiver by a user-operated remote control.

B) It is another object to restore operation of the television receiver by the same remote control.

C) It is a further object to enable a user to lock out the television image, sound, and closed captioning functions by means of an alphanumeric code entered on a remote control keyboard.

D) It is a further object to enable the user to disrupt or restore the functions listed in object (C) above to any of several receivers by means of the identical code entered on the same remote control keyboard.

E) It is a further object to indicate a disrupted condition by colorizing the image blocked on the imaging screen with a selected hue.

Other attendant advantages will be more readily appreciated as the invention becomes better understood by reference to the following detailed description and compared in connection with the accompanying drawing in which like reference numerals designate like parts throughout the figures. It will be appreciated that the drawing may be exaggerated for explanatory purposes.

DESCRIPTION OF THE PREFERRED EMBODIMENT

Figure 1:
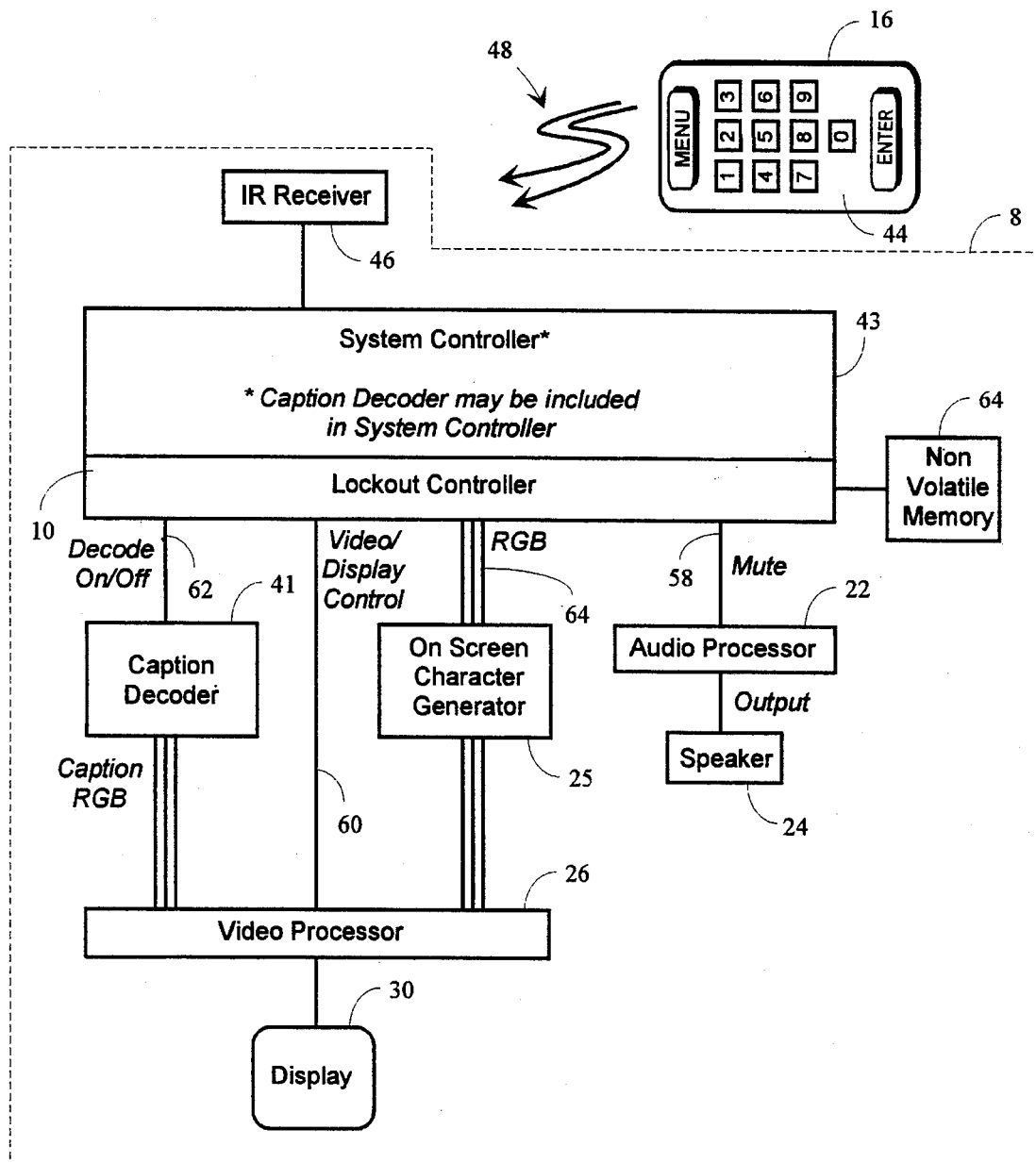
FIG. 1 is a simplified block diagram of a color television display system according to the present invention.

Referring now to FIG. 1, there is shown a simplified block diagram of a color television receiver 8 that includes a television receiver lock-out controller 10 that accomplishes the objectives of the present invention.

Within the television receiver, the audio processor 22, the caption decoder 41, and the video processor 26 are controlled by a microprocessor 43. The microprocessor is also termed a "system controller," as that term defines its essential function.

The drawing depicted and described covers only the components of interest to the present invention and excludes details of signal processing and other circuits well known in the art.

The operation of the microprocessor 43, in terms of operator input, is controlled by means of a user-operated alphanumeric keyboard 44 located on the remote control hand-set 16. The commands entered on the keyboard 44 are transmitted to the remote control receiver 46 of the television 8 by way of an infrared signal, which is indicated diagrammatically by the arrows 48.

When the user enters a command by depressing a push-button switch on the keyboard 44 of the remote control hand-set 16, a pulse-code-modulated, infrared signal consisting of a train of digits is transmitted to the remote control receiver 46, which demodulates the signal and routes it to the microprocessor 43.

In controlling the operation of the television receiver 8, the microprocessor 43 interprets and processes the user commands entered from the remote control unit 16 and issues commands to the components of the television receiver; e.g., tuning, volume, channel selection, etc.

Typical operating parameters controlled by the remote unit 16 include power on-off, channel selection, audio volume and audio mute. On-screen displays can be called up such as: menus, channel/time and closed captioning. The "ENTER" push-button is sometimes used to execute a command following its selection.

In practice, the circuitry and firmware of the lock-out controller 10 is incorporated directly into the microprocessor 43. According to the preferred embodiment, the lock-out controller 10 provides what is essentially a toggle switch operation; that is, the disruption and restoration of the video, audio and closed caption functions are accomplished by entering the same sequence of commands from the remote control hand-set 16. Alternatively, different command sequences can be used for disruption and restoration. The details of the operation of the lock-out controller 10 operating in conjunction with the remote control hand-set 16 and the microprocessor 43 are described in the following paragraphs in conjunction with FIG. 2.

Activation Sequence

The status of the television receiver 8 is as follows: The receiver 8 is ON, providing for a displayed image on the television in order to provide feedback to the operator of the remote control hand-set 16. The remote control disruption/restoration of the television could alternatively be accomplished with the television "OFF".

The lock-out controller 10 includes three count-down timers (not shown), with timing durations as noted:

Timer One: time T1, five seconds

Timer Two: time T2, twenty seconds

Timer Three: time T3, two seconds

The lockout/unlocking command may be, by way of example, the sequential activation of alphanumeric pushbutton switches "MENU, 911 ENTER." "MENU" is the initial enabling key that starts the lock-out procedure, and "911" is the multiple keying that activates the lock-out condition. The "ENTER" key sends the command to execute the lock-out condition. A television according to the present invention can be designed to accept any arbitrary, and preferrably nonstandard, command sequence.

Figure 2:
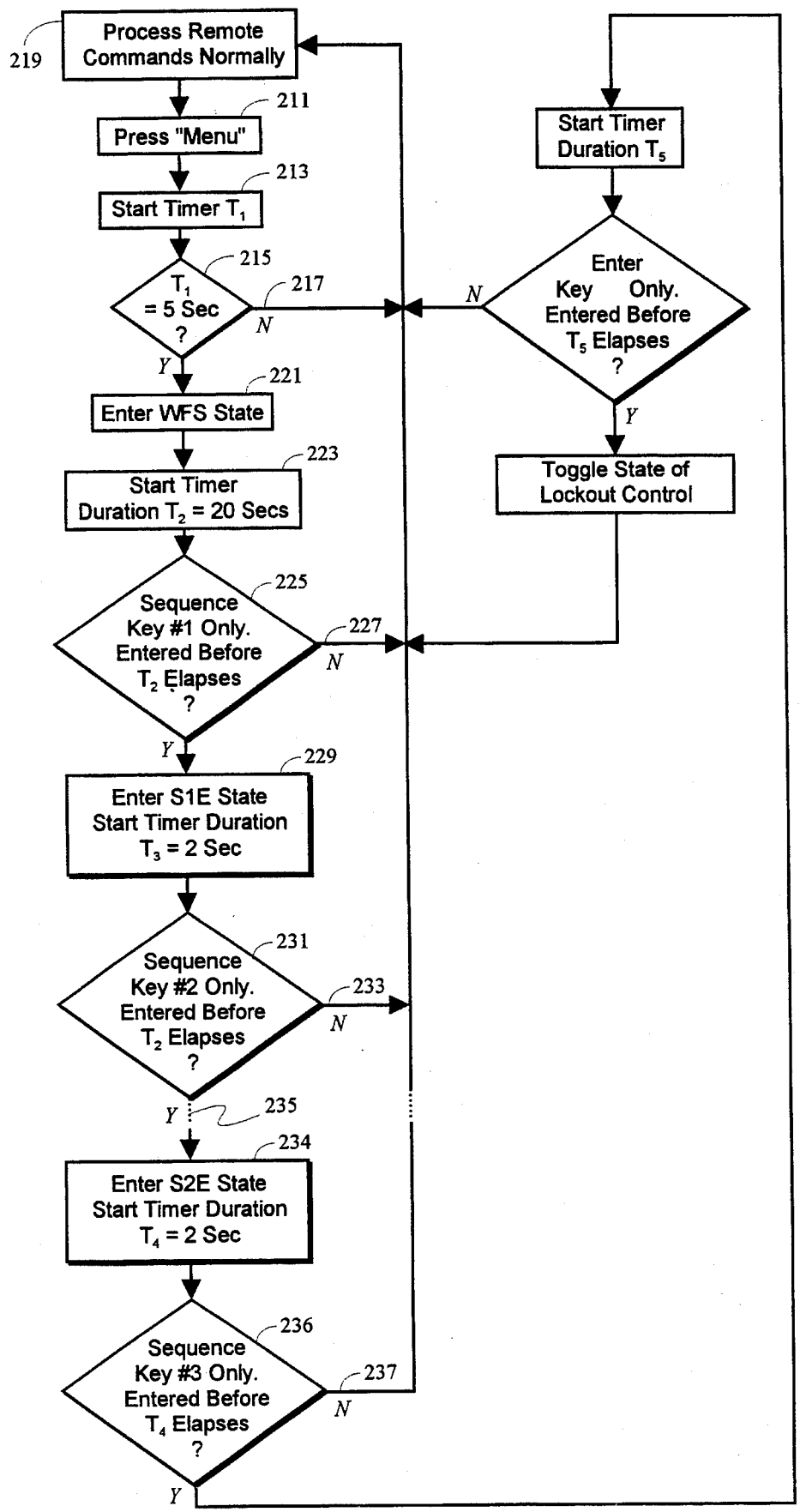
FIG. 2 is a flow chart for operation of a television controller according to the present invention.

TV Receiver Lock-out Procedure (FIG. 2)

The First State: Actuation of "MENU" the Initial Enabling Key

The MENU key is depressed 211 for Time T1. The remote control hand-set transmits its MENU command to the remote control receiver by way of infrared signal.

Result: The on-screen menu appears. Timer One starts 213 the five-second timing cycle and is monitored 215 to detect whether the duration of its running meets or exceeds Time T1.

If the MENU key is released before five seconds, Time T1 is not met 217, Timer One is reset, and the menu command is processed according to its normal routine 219.

If Time T1 is met, the lock-out controller 10 advances to the Wait for Sequence (WFS) state 221. The WFS state is indicated by the replacement of the on-screen menu by the channel/time indicator of the display.

The Second State: Actuation of the Predetermined Multiple Keys

Timer Two is then started 223 with a duration of Time T2, or twenty seconds. During this period, any activation of the enabling (MENU) key is ignored. The lock-out controller 10 looks 225 to receive the first numeral key, key 9, of the activation sequence.

Result: If Timer Two counts down to zero before the enabling numeral key 9 is pressed, or if an incorrect numeral key is entered, the WFS state is exited 227, and the processing of the remote control commands defaults back to the normal mode of operation 219, and the televised image is restored.

If the correct numeral key, key 9, is entered, the lock-out controller 10 enters the Sequence 1 Entered (S1E) state 229, and Timer Three is started for a duration of two seconds. As with the WFS state, the controller ignores any actuation of the previous sequence key (MENU), and determines 231 that only the next key of the numeral 911 sequence, numeral key 1, is entered before Timer Three counts down to zero. If not, 223, the normal mode of operation 219 is restored.

If yes, the state S2E is entered 234 and timer T3 is started for a time T4 or two seconds. The controller checks 236 that only the final numeral key of the 911 sequence, numeral key 1, is entered before Timer 3 counts down to zero. If not, 237 operation is returned to normal 219. If the last numeral key is entered properly, the controller enters state S3E and awaits the ENTER command before a last time T5 expires. As indicated by dashed line 235, the activation sequence may consist of more than the three keys "911" illustrated for the preferred embodiment.

Any time-out, or the pressing of an incorrect key, will cause the remote control unit to revert to normal command processing, and the televised image will be restored.

When the correct activation sequence has been entered and accepted, the lock-out condition, according to the invention, is executed upon pressing of the ENTER key and the video, audio and closed caption functions will be disabled.

Disablement

Referring again to FIG. 1, the command paths from the lock-out controller 10 to the components/stages controlled, are indicated in the drawing by the control lines 58, 60, 62, 64.

The audio lock-out command path 58 links the lock-out controller 10 with the audio signal processor 22 to mute the sound of the speaker 24.

The image display 30 can be masked or otherwise obscured by any one or a combination of the following ways. The video processor 26 can adjust the operating biases of the contrast and brightness to their lowest levels through the video/display control command path 60 in order to "blank" the image on the screen. Alternatively, in some television receivers, the video processor 26 can be programmed through the same command path to generate an entire image field 30 which is, for example, blue in coloration. A blue display is a useful indicator that the television receiver 8 is in a lock-out condition.

Alternatively, the display 30 may be blocked over the "RGB" control line 64 by means of programming the on-screen character generator 25 to produce on the "safe-title" area, i.e., that area available over the majority of the display for character generation; a block-like configuration of a single hue which effectively obscures all but the periphery of the display.

The closed caption lock-out command path 62 is routed from the lock-out controller 10 to the closed caption decoder 41. In order to deprive the end user of captioning the caption decoder 41 is turned off.

As a result of the activation of the sequence of alphanumeric control keys that is, "MENU 911" in this example, and "ENTER," the lock-out feature is toggled on, and all use of the television receiver is effectively denied. The lock-out condition is stored in a non-volatile memory circuit 64, where it is maintained until changed by the TV Receiver Unlocking Procedure described in the following paragraph.

TV Receiver Unlocking Procedure

To unlock the lock-out controller 10 and restore normal control and normal television receiver operation, the same sequence, and the same time intervals, are followed, using the same keys—"MENU 911" and "ENTER." In response, the lock-out controller 10 in effect toggles, and the video, the audio, and the closed caption functions are fully restored. Again, an entirely different sequence of commands could be used for restoration if so desired.

While the present invention has been illustrated and described in connection with the preferred embodiments, it is not to be limited to the particular structure shown, because many variations thereof will be evident to one skilled in the art and are intended to be encompassed in the present invention as set forth in the following claims:

Having thus described the invention,

What is claimed is:

1. A method for disrupting the normal functioning of an audio-visual display device, comprising:

A) transmitting a series of codes from a remote control unit to the audio-visual display device;

B) recognizing the series of codes within the audio-visual display device;

C) changing the state of operations of the audio-visual display device from normal to disrupted upon recognition of the series of codes; and D) storing an indication of the state of operations in non-volatile memory within the audio-visual display device.

2. The method according to claim 1 wherein the step of changing the state of operations of the audio-visual display device from normal to disrupted further includes:

displaying a solid color visual display.

3. The method according to claim 1 wherein the step of changing the state of operations of the audio-visual display device from normal to disrupted further includes:

setting contrast and brightness levels of the visual display to less than optimal settings.

4. The method according to claim 1 wherein the step of changing the state of operations of the audio-visual display device from normal to disrupted further includes:

causing a character generator of the audio-visual display device to produce a single hue over substantially the entire field of the visual display.

5. The method according to claim 1 wherein the step of changing the state of operations of the audio-visual display device from normal to disrupted further includes:

disrupting an audio output of the audio-visual display device.

6. The method according to claim 1 wherein the step of changing the state of operations of the audio-visual display device from normal to disrupted further includes:

disrupting a closed captioning function of the visual display.

7. The method according to claim 1 wherein the step of changing the state of operations of the audio-visual display device from normal to disrupted further includes:

changing the state of operations from disrupted back to normal upon a second transmission and recognition of the series of codes.

8. The method according to claim 1 wherein the step of transmitting a series of codes further includes transmitting an entry code to activate a disruption subroutine, followed by an activation sequence of codes to enable the disruption subroutine.

9. The method according to claim 8 including the further step of transmitting a command code to activate the changing of the state of operations of the audio-visual display device.

10. A method for disrupting the normal functioning of an audio-visual display device comprising:

A) transmitting an entry code from a remote control unit to an audio-visual display device for a first set amount of time;

B) advancing the audio-visual display device to an activation state in a disruption subroutine upon receipt of the entry code;

C) transmitting a first activation code from the remote control unit to the audio-visual display device within a second set amount of time from entering the activation state;

D) advancing the audio-visual display device to a first sequence state in the disruption subroutine;

E) transmitting a second activation code from the remote control unit to the audio-visual display device within a third set time less than the second set time;

F) advancing the audio-visual device to a second sequence state in the disruption subroutine;

G) transmitting a third activation code from the remote control unit to the audio-visual display device within the third set time;

H) advancing the audio-visual display device to third sequence state in the disruption subroutine;

I) transmitting a command code after the activation codes to achieve disruption of normal operations of the audio-visual display device within a fourth set time.

11. The method of claim 10 further including:

returning to normal audio-visual display device operation if the code transmission sequence is not received within the set times.

12. The method of claim 10 further including:

disrupting the visual display of the audio-visual display device.

13. The method of claim 12 further including:

setting contrast and brightness levels of the display to less than optimal settings.

14. The method of claim 12 further including:

displaying a solid color visual display.

15. The method of claim 12 further including:

causing a character generator of the audio-visual display device to produce a single hue over substantially the entire field of the visual display.

16. The method of claim 10 further including:

disrupting an audio output of the audio-visual display device.

17. The method of claim 10 further including:

disrupting a closed captioning function of the audio-visual display device.

18. The method of claim 10 further including:

restoring normal operations of the audio-visual display device by transmitting the same code sequence as set forth in claim 10 to the audio-visual display device a second time.

* * * * *

US005537612C1

(12) EX PARTE REEXAMINATION CERTIFICATE (10055th)
United States Patent
Cherrick et al.

(10) Number: US 5,537,612 C1
(45) Certificate Issued: Feb. 26, 2014

(54) REMOTELY SELECTABLE AUDIO/VIDEO/TEXT DISRUPTION

(75) Inventors: Sol M. Cherrick, Chicago, IL (US); Kevin J. Gaughan, Arlington Heights, IL (US)

(73) Assignee: LG Electronics Inc., Yoido-Dong, Youngdungpo-Gu, Seoul (KR)

Reexamination Request:
No. 90/009,630, Oct. 30, 2009

Reexamination Certificate for:
Patent No.: 5,537,612
Issued: Jul. 16, 1996
Appl. No.: 08/239,646
Filed: May 9, 1994

(51) Int. Cl.
*H04N 7/16* (2011.01)

(52) U.S. Cl.
USPC .......... 380/242; 348/E7.06; 380/234; 725/25; 725/30

(58) Field of Classification Search
USPC ............................................. 380/7
See application file for complete search history.

(56) References Cited

To view the complete listing of prior art documents cited during the proceeding for Reexamination Control Number 90/009,630, please refer to the USPTO's public Patent Application Information Retrieval (PAIR) system under the Display References tab.

*Primary Examiner* — Majid A. Banankhah

(57) ABSTRACT

A television receiver is equipped with hardware/firmware so that it may be disabled by a remotely transmitted series of codes. In a preferred embodiment, the display of the receiver indicates that the receiver is operable, but has been disrupted, rather than being broken. The invention is particularly useful for commercial situations such as rentals or lodging facilities where payment is expected for use of the television.

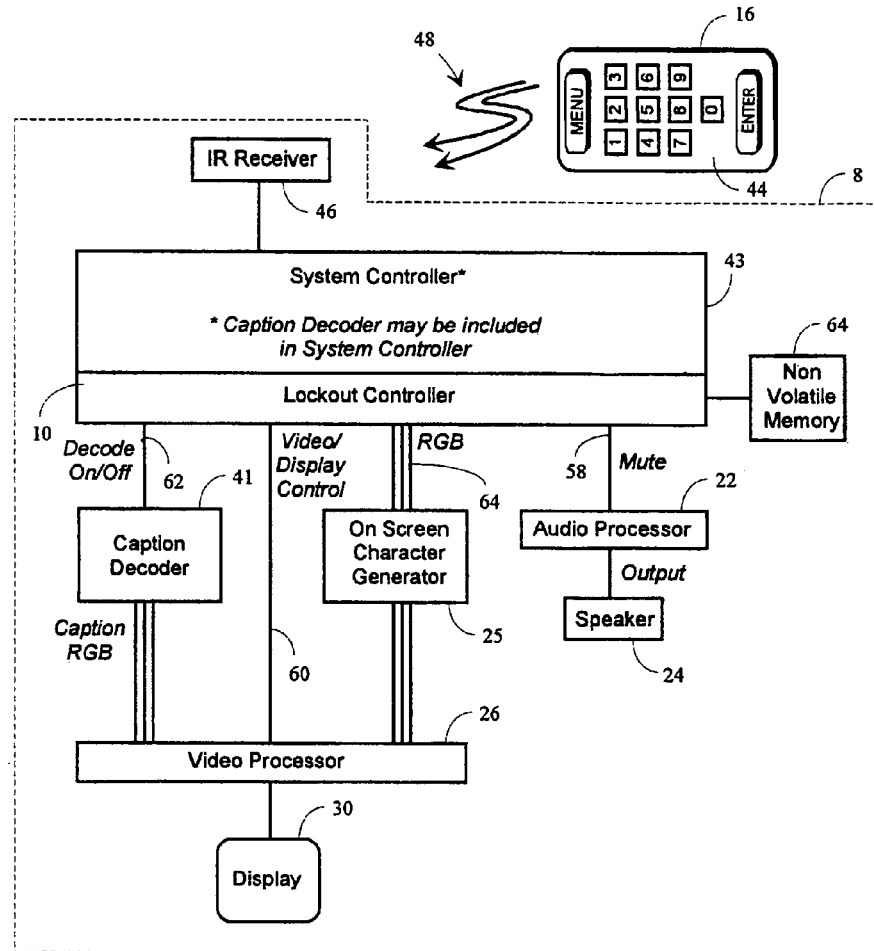

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9 are cancelled.

Claims 10-18 were not reexamined.

\* \* \* \* \*